Nov. 6, 1962 M. WOLF 3,062,126
BEVERAGE INFUSION APPARATUS
Filed June 3, 1960 3 Sheets-Sheet 1

INVENTOR
Martin Wolf
BY Bierman + Bierman
ATTORNEYS

Nov. 6, 1962    M. WOLF    3,062,126
BEVERAGE INFUSION APPARATUS
Filed June 3, 1960    3 Sheets-Sheet 2

INVENTOR
Martin Wolf
BY
ATTORNEYS

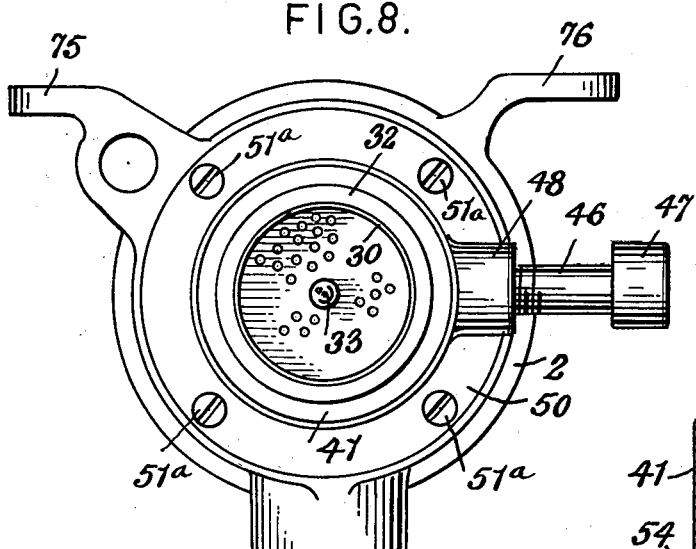
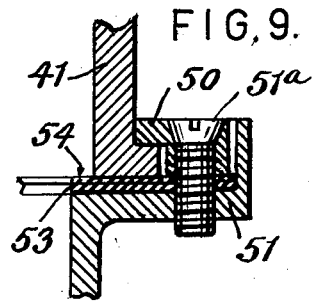
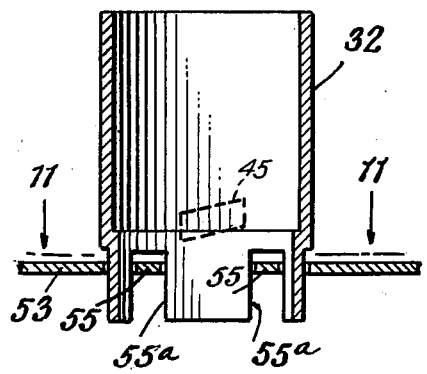
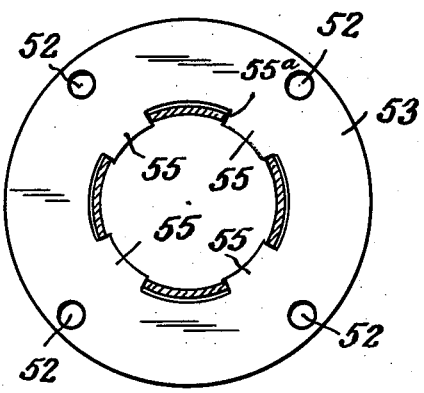
INVENTOR
Martin Wolf

United States Patent Office 3,062,126
Patented Nov. 6, 1962

3,062,126
BEVERAGE INFUSION APPARATUS
Martin Wolf, Apartado Postal 1316, Mexico City, Mexico
Filed June 3, 1960, Ser. No. 33,715
8 Claims. (Cl. 99—289)

This invention relates to a beverage infusion apparatus particularly adapted for making coffee, tea, and other liquid foods or beverages, and has for one of its objects the provision of a compact, sanitary, easily-operated apparatus by which infusion will occur at a high temperature of the liquid and the extraction of a very good quality beverage will take place.

It is an object of the invention to provide an infusion device in which the coffee, tea, or other product to be infused can be sanitarily contained in a puncturable wrapper or cover and shall assume the aspect of a cartridge insertable as a unit in the apparatus and in which the covering shall serve as a filter for the infusion liquid.

It is an object of the invention to provide an apparatus of this character in which the temperature of the infusion liquid shall be controlled; in which the used cartridge of the material that is infused may be easily removed and ejected; with which the parts of the device may be readily rinsed and cleansed, and in which the simple manipulation of a single handle effects the infusion.

With these and other objects to be hereinafter set forth in view, I have devised the arrangement of parts to be described and more particularly pointed out in the claims appended hereto.

In the accompanying drawings, wherein an illustrative embodiment of the invention is shown FIG. 1 is a vertical sectional view of a beverage infusion device constructed in accordance with the invention;

Figure 4:
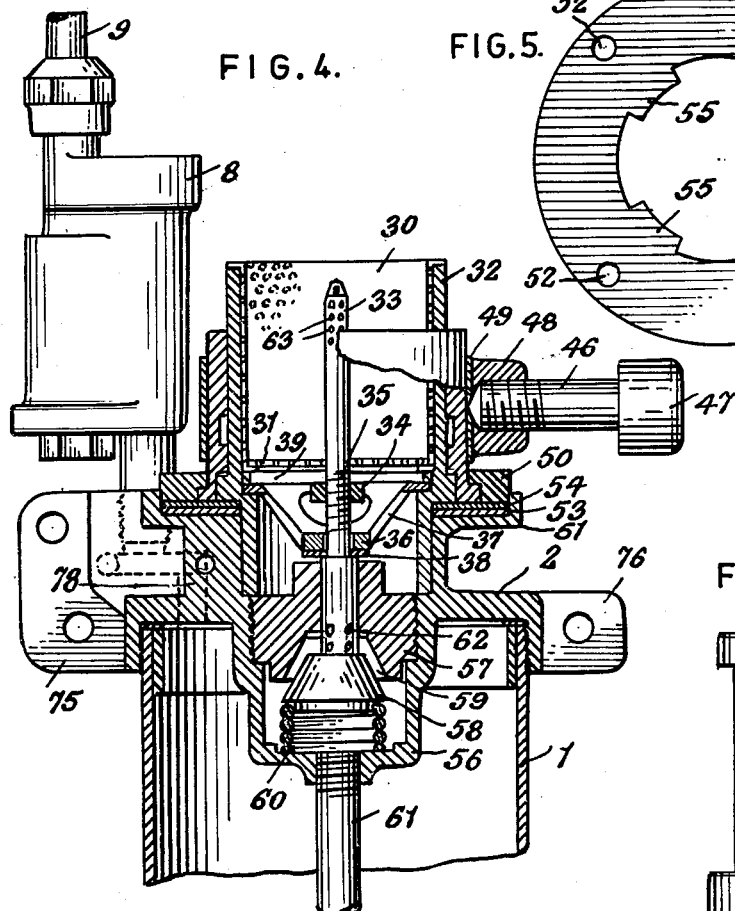
FIG. 4 is a vertical sectional view of the upper end portion of the apparatus, the section being taken at right angles to FIG. 1.

FIG. 8 is a top plan view of the structure of FIG. 4, with the safety valve and supply pipe omitted; FIG. 9 is a detail view of one of the fastening screws and the parts through which it passes; FIG. 10 is a vertical sectional view through the cartridge-receiving cup, and FIG. 11 is a sectional view taken substantially on the line 11—11 of FIG. 10, looking in the direction of the arrows.

Referring to the drawings, 1 indicates generally the body of the hot water container, the same being preferably, but not necessarily, of cylindrical form. Threadably mounted on the upper end of the container body 1 is a housing 2 constituting a closure for the upper end of the container 1 and a holder or support for most of the mechanism of the device. Lugs 75 and 76 (FIG. 4) are provided on the housing to enable the device to be readily attached to a wall or other suitable supporting surface. Provided in the lower portion of the container 1 is an electric heater 3 suitably mounted in the end closure 4. The wiring 5 for the heater and for a thermostat 6 is protected by the domed closure disk 7. The thermostat 6 is operative to control the operation of the heater 3 and thus regulate the temperature of the water in the container.

Threadably mounted in the housing member 2 is a combined non-return and safety valve 8 of known construction, the same being connected to the supply pipe 9 leading from a source of water. Water passing through the pipe 9 and past the valve 8 enters through the hollow center 10 of a cock or tap 11 rotatably mounted in the housing member 2, and the water can, if desired for other use, be dispensed out of the spigot-end 67 by a quarter turn of the cock or tap 11. Otherwise, the water will descend into the container 1 through a duct 78 and will be heated by the electric heater 3 for use for infusion purposes.

The material 20 (FIG. 6) to be infused, and which may be coffee, tea, or any one of various other products, is preferably in the form of a package or cartridge having an outer wrapping or covering 22, the package or cartridge being generally indicated at 21. The wrapping or covering may be composed of paper or other readily-puncturable material having filtering characteristics. The package or cartridge 21 may be cylindrical, square or of other suitable shape, and is preferably of a size and shape to enable it to conform to and snugly fit within the carrier shown in FIG. 6 and indicated at 23. This carrier includes an inner cylinder or sleeve 24, open at its lower end, and the package or cartridge 21 is fitted within and is held by frictional fit within the cylinder 24 substantially as shown in FIG. 6.

Figures 6, 7:
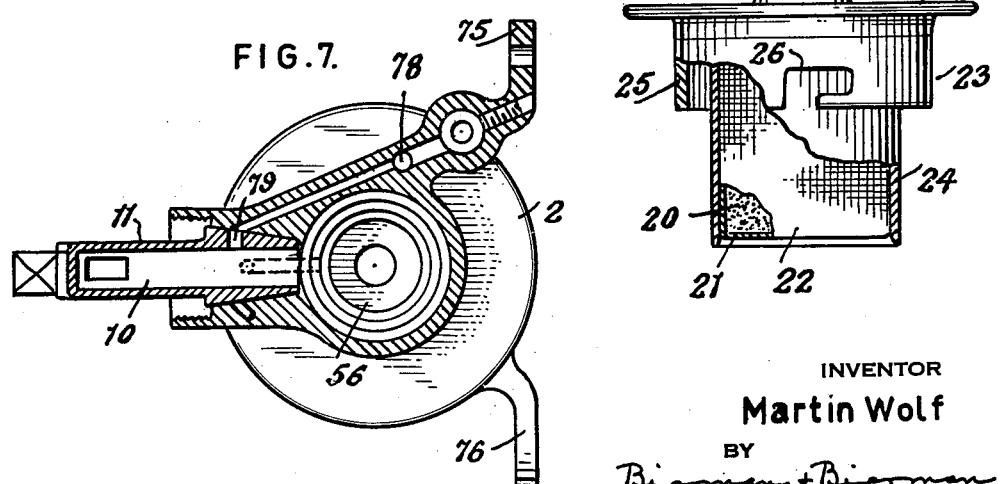
FIG. 6 is an elevational view of the cartridge carrier, with some parts broken away and other parts shown in section to disclose construction.
FIG. 7 is a sectional view across the upper portion of the housing member.

The cylinder or sleeve 24 is surrounded by an annular skirt 25 inwardly spaced from the sleeve 24 and provided with a pair of bayonet slots 26, one of which is shown in FIG. 6, there being a second one located diametrically opposite in the skirt 25. A central boss 26a extends upwardly from the top plate 27 of the carrier and the same guides a slidable stem 28, topped by a cap 29. The stem 28 is axially slidable through the carrier and can be used as a plunger to eject the cartridge 21 out of the carrier after it has been used.

After a package or cartridge 21 has been placed in the carrier as above described, the carrier and the cartridge held by it are ready for insertion in the cup of the infusion device. The cup includes a lining member 30 having a bottom plate 31, the side wall of the cup thus formed, as well as the bottom thereof, being of a foraminous nature. The cup 30 and the bottom plate 31 are seated within a cylinder 32 mounted for raising and lowering movement in the housing member 2.

When the carrier 23 is fitted on the cup, it brings its cartridge down into the cup 30 and as this is done, the bottom of the covering 22 of the cartridge will be punctured by the perforated conical upper end of a hollow stem 33 extending vertically and centrally within the cup 30. Axial movement of the stem 33 in one direction is limited by a nut 34 adjustable on a threaded portion 35 of the stem and its contact with the hub 36 of a spider 37 through which the stem 33 is slidably movable. A shoulder on the stem supports a washer 38. The spider 37 is held within the cylinder by means of the ring 39.

When the carrier, containing the cartridge, is fitted on the device as above described, it will be held thereon by the engagement of radially-extending studs 40 (FIG. 1) on the cylinder 32 with the bayonet slots 26 provided on the carrier. After the carrier and the cartridge borne by it are fitted in position, with the turning of a handle 46 as will be described, the infusion operation will be initiated. This is done by causing a descent of the stem 33 to the position shown in FIG. 4. Shown at 41 (FIG. 2) is a rotatable sleeve provided with a lower radial flange 42 and an internal groove 43.

The sleeve 41 concentrically encircles the cylinder 32 and inclined parts 45 on the cylinder 32 enter the spiral groove 43 in such a manner that rotative movement of the sleeve 41 will cause a raising or lowering movement of the cylinder 32 and the parts associated with it. The desired rotative movement of the sleeve 41 is effected by means of a handle 46 terminating in a knob 47. The handle 46 is threaded into a boss 48 provided on a ring 49 encircling and secured to the sleeve 41. The sleeve 41 is held against vertical movement by a retaining ring 50 which takes over the radial flange 42. Ring 50 is secured to a seat 51 provided on the housing member 2 by suitable screws which pass through holes 52 in an annular plate 53 the screws being shown at 51a, said screws also passing through holes in a soft packing 54 and entering threaded holes provided in the housing member 2, as shown in FIG. 9.

The plate 53 rests upon the seat 51 and is located between the upper face of the seat and a soft packing 54, and is provided with four teeth 55 arranged to engage with complementary parts 55a on the peripheral surface of the holder or cylinder 32 as shown in FIGS. 10 and 11. Thus, since the screws passing through the holes 52 prevent the turning movement of the plate 53, its toothed engagement with the cylinder 32 will prevent turning movement of the cylinder but will permit its up and down movement when the handle 46 is manually turned.

Figure 1:
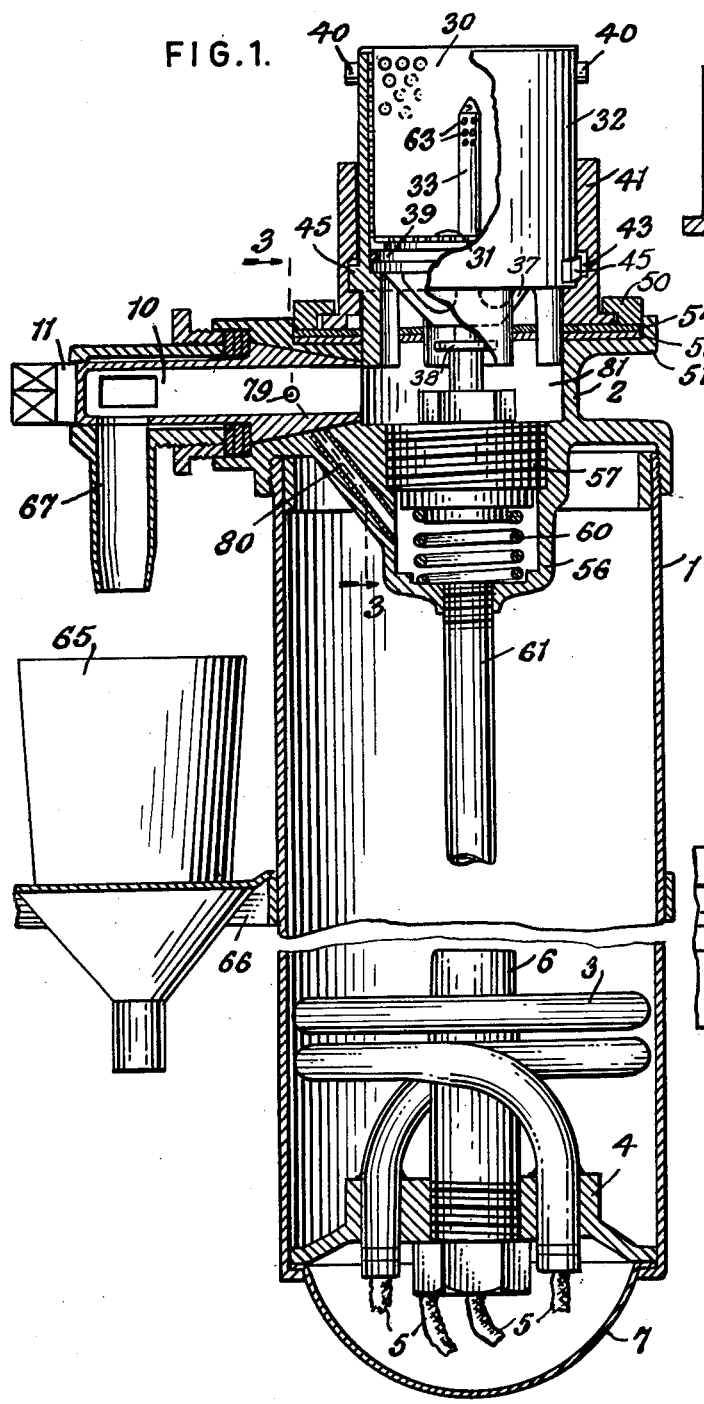
Figure 2:
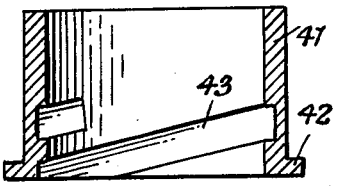
FIG. 2 is a vertical sectional view of the actuating sleeve.

Provided as a part of the housing member 2 is a central hollow boss 56 located within the container 1 near the top thereof and said boss is internally threaded to receive a sleeve 57 having a central passage forming a guide for a part of the stem 33. At its lower end the stem 33 carries a conical valve head 58 adapted to normally seat against a conical seat 59 provided at the bottom of the sleeve 57. A coil spring 60 is located within the boss 56 and is effective to normally seat the valve 58 and maintain the stem in its elevated position as shown in FIG. 1.

When the handle 46 is turned, and before a half turn of the sleeve 41 occurs, the spider 37 through washer 38 will have exerted downward pressure on the stem 33 in opposition to the force of the spring 60, to such an extent as to cause a mixture of steam and hot water to enter from the container through the pipe 61 connected to the boss 56 and leading from the lower end portion of the container 1. The water and stem thus entering into the boss 56 will, under prevailing pressure, pass upwardly through holes 62 provided in the lower portion of the stem 33 and through the hollow interior of the stem to emerge out of the holes 63 in the top portion of the stem to reach the contents of the cartridge, thus initiating the desired infusion. The infused liquid filters itself, impulsed by the original pressure from the container 1, through the filter-like wrapper or covering 22 of the cartridge, and then by manipulation of the cock or tap 10, it can be drawn off from chamber 81 through the hollow stem of the cock or tap and spigot 60 into a receptacle 65, supported on the bracket 66 mounted on the container body 1.

Figure 3:
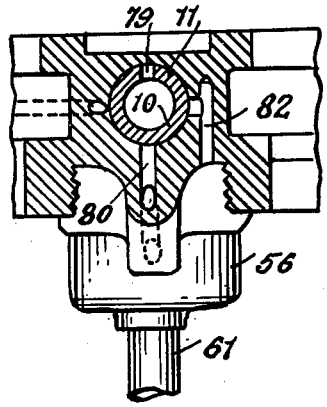
FIG. 3 is a sectional view, taken substantially on the line 3—3 of FIG. 1, looking in the direction of the arrows.
Figure 5:
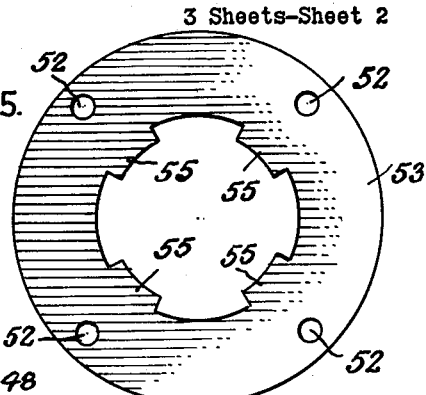
FIG. 5 is a face view of the annular plate which maintains the cup against rotative movement while permitting its vertical movement.

Through the arrangement of parts provided, and as seen in FIGS. 3 and 7, cold water, hot water or the infused beverage may be selectively drawn from the device. Cold water entering through valve 8 can descend into the container 1 through duct 78 or it can, by a partial turn of the cock or tap 11, be directed out through the spigot 67. If hot water is desired, the supply in the container 1 can be tapped, either for rinsing out the interior of the device, or for other purposes, by alinement of the port 79 in the cock or tap 11 with the duct 80, thus establishing communication between the interior of the container 1 and the hollow stem 10 of the tap. The infusion beverage forced down through the foraminous bottom 31 of the cup 30 will descend into the chamber 81 below the cup and into the hollow interior of the tap from whence it can flow by the proper turning movement of the tap. The properly heated infusion water in the container has a corresponding pressure according to well-known thermodynamic laws, regulatable in the thermostat. When infusion is started, the water from the container rises under the regulatable pressure, entering into the infusion chamber, where a partial expansion takes place, thus converting part of the pressurized water into steam, which because of its more penetrating quality in conjunction with the water, makes the infusion instantaneous, and under the action of the diminished but still sufficient pressure, the infused beverage is forced down into the chamber 81 below. The passage shown at 82 in FIG. 3 is an air vent outlet.

Having thus described a single embodiment of the invention, it is obvious that the same is not to be restricted thereto, but is broad enough to cover all structures coming within the scope of the annexed claims

What I claim is:

1. A beverage infusion apparatus comprising, a container for a heated liquid, a cup mounted on top of the same, a passage establishing communication between the cup and the interior of the container, a hollow stem slidably mounted in said passage, said stem having a conical end portion provided with a plurality of small apertures in its side wall located within the cup, a carrier containing a cartridge of material to be infused, interengaging elements on the carrier and cup by which the carrier is positioned on the cup with the cartridge disposed on the inside of the cup and caused to be punctured by the apertured conical end portion of the hollow stem, a spring-biased valve carried by the stem, the stem being perforated adjacent to said valve so that liquid from the container will enter the perforated part of the stem and be forced through the stem and out of its apertured end when the valve is open, and means for opening the valve in opposition to the force of its spring.

2. A beverage infusion apparatus comprising, a container for a heated liquid, a cup holding a cartridge composed of a wrapping of puncturable sheet material containing material to be infused, a hollow slidable stem having a conical apertured end entering the cartridge, said stem having a perforated portion remote from its apertured end for establishing communication between the hollow interior of the stem and the interior of the container, a valve carried by the stem and normally effective to interrupt said communication, and means for axially moving the stem to open the valve and establish the communication and cause liquid from the container to flow through the stem and out of its apertured end.

3. A beverage infusion apparatus comprising, a container for a heated liquid, a cup mounted at the top of the same, a passage establishing communication between the cup and the interior of the container, a hollow stem slidably mounted in said passage, the stem having an apertured upper end portion located within the cup, a carrier for a cartridge of material to be infused, cooperating means on the carrier and cup by which the carrier is positioned on the cup with the cartridge borne by it disposed on the inside of the cup and having its bottom punctured by the apertured upper end portion of the hollow stem, a spring-biased valve carried by the stem at a point remote from its apertured upper end, the stem being perforated adjacent to said valve with its perforations so positioned that liquid under pressure in the container will enter through the perforated part of the stem and will be forced upwardly through the hollow interior of the stem and out of its apertured upper end and into the cartridge when the valve is opened, and means for causing axial movement of the stem to open the valve in opposition to the force of its spring.

4. A beverage infusion apparatus comprising, a container for a heated liquid, a foraminous cup holding a cartridge of material to be infused, said cartridge having a liquid-permeable covering, a hollow slidable stem having a conical apertured end puncturing the covering and entering the cartridge, said stem having a perforated rear portion remote from its apertured end for establishing communication between the hollow interior of the stem and the interior of the container, a valve carried by the stem and normally effective to interrupt said communication, means for raising and lowering the cup and causing axial movement of the stem on the lowering movement of the cup to thereby open the valve and establish communication between the interior of the stem and the container and cause liquid from the container to flow through the stem and out of its apertured end.

5. A beverage infusion apparatus comprising, a liquid-holding container, a cup supported at the top of the container, a puncturable cartridge containing a material to be infused, means for raising and lowering the cup, a hollow stem extending into the cup through the bottom thereof and having an apertured forward, cartridge-piercing end located within the cup, a valve seat located below the cup, the stem being slidable through the seat, a valve head carried by the stem, spring means effective to normally hold said valve head against the seat, the stem having perforations normally blocked by the valve seat while the valve head is seated and open to establish communication between the interior of the stem and the interior of the container when the valve is off its seat whereby liquid under pressure will be forced through the perforations to the interior of the stem to thereby reach the interior of a cartridge located in the cup and pierced by the stem.

6. A beverage infusion apparatus comprising, a liquid-holding container, means within the same for heating liquid therein, a housing fitted on the top of the container, said housing having a central hollow boss located within the container, a threaded valve seat fitted in the boss, a stem slidable through the valve seat and having a valve head for seating against said seat, a spring in the boss for normally holding the valve head in seated position, a cup mounted in the housing above the valve seat and capable of an up and down movement relatively to the housing, means for effecting such up and down movement, an abutment on the stem, means carried by the cup for engaging with the abutment to cause lowering movement of the stem and displacement of the valve head from its seat on lowering movement of the cup, a conduit communicating at one end with the interior of the boss and at its other end with the interior of the container, the stem having an apertured upper end located within the cup and having a perforated lower end adjacent to the valve head, said perforaed lower end of the stem being so located that the perforations therein are closed by the valve seat when the valve head is seated and open to the interior of the boss when the valve head is disposed away from its seat.

7. A beverage infusion apparatus comprising, a liquid container, liquid-heating means contained within the same, a cup on the container, a cartridge holder fitted on the cup in a manner to position a puncturable cartridge carried by the holder within the cup, a cartridge in said cup, a hollow stem moved through the bottom of the cup and reaching and piercing the cartridge, the stem including valve means operative to permit a flow of liquid from the interior of the container to the interior of the stem upon depression of the stem, the stem being apertured at its cartridge-piercing end, a tap connected to the container, a source of water supply connected to the container, duct means by which the tap can be employed to draw water from within the container; to draw water directly from its source of supply or else to draw off the infused liquid after the water has flowed through the stem and has passed through the contents of the cartridge.

8. In a beverage infusion apparatus, a container including a cup, a cartridge-piercing hollow stem constituting a fluid passage and entering the cup from the bottom and having a pointed end acting to pierce the wrapper of a cartridge located in the cup, a cartridge holder fitted on the cup, a puncturable cartridge in the cartridge holder, said cartridge containing a granulated material through which a liquid is infused, the said holder including a sleeve within which the cartridge is fitted, the holder being open at the bottom to allow access of the stem to the bottom of the cartridge to pierce the same, the stem including valve means operative to permit a flow of liquid from the container into the cup, and a plunger carried by the holder for causing ejection of a used cartridge out of the holder.

References Cited in the file of this patent

UNITED STATES PATENTS

| | | |
|---|---|---|
| 622,429 | Hazzard | Apr. 4, 1899 |
| 660,740 | Wall | Oct. 30, 1900 |
| 1,216,180 | Stuewe | Feb. 13, 1917 |

FOREIGN PATENTS

| | | |
|---|---|---|
| 22,165 | Great Britain | Oct. 11, 1902 |